United States Patent [19]
Ciaffone

[11] 3,914,576
[45] Oct. 21, 1975

[54] REEL FOR STORING AN ELECTRICAL LINE CORD

[75] Inventor: John T. Ciaffone, Bridgeport, Conn.

[73] Assignee: Warner-Lambert Company, Morris Plains, N.J.

[22] Filed: May 6, 1974

[21] Appl. No.: 467,330

[52] U.S. Cl........... 219/214; 219/296; 222/146 HA; 242/100
[51] Int. Cl.$^2$............................................. H05B 1/00
[58] Field of Search........ 242/54 R, 54 A, 100, 107; 219/280, 281, 319, 315, 39.12, 214, 296–299, 302–307, 441; 174/135

[56] References Cited
UNITED STATES PATENTS

| | | |
|---|---|---|
| 2,341,401 | 2/1944 | White .............................. 242/54 A |
| 2,348,966 | 5/1944 | Dow et al....................... 242/107 R |
| 2,859,326 | 11/1958 | Fisher, Jr........................... 219/315 |
| 3,358,885 | 12/1967 | Flowers....................... 222/146 HA |
| 3,423,571 | 1/1969 | Trachtenberg et al............ 219/441 |

Primary Examiner—Leonard D. Christian
Attorney, Agent, or Firm—Jeremiah J. Duggan; Albert H. Graddis

[57] ABSTRACT

The specific disclosure provides a reel for storing an electrical line cord comprising a cylindrical member, and a channel helically formed on the cylindrical member. A sleeve is concentrically aligned with the cylindrical member and encloses the channel. A slotted perforation is formed in the sleeve and extends across the channel. Mounting means are provided for permitting relative rotational movement between the cylindrical member and the sleeve. The electrical line cord extends between the cylindrical member and the sleeve into one end of the channel and from the channel through the slotted perforation. Relative rotation in one direction between the cylindrical member and the sleeve winds the electrical line cord in the channel, and relative rotation in another direction between the cylindrical member and the sleeve unwinds the electrical line cord from the channel out through the slotted perforation.

2 Claims, 5 Drawing Figures

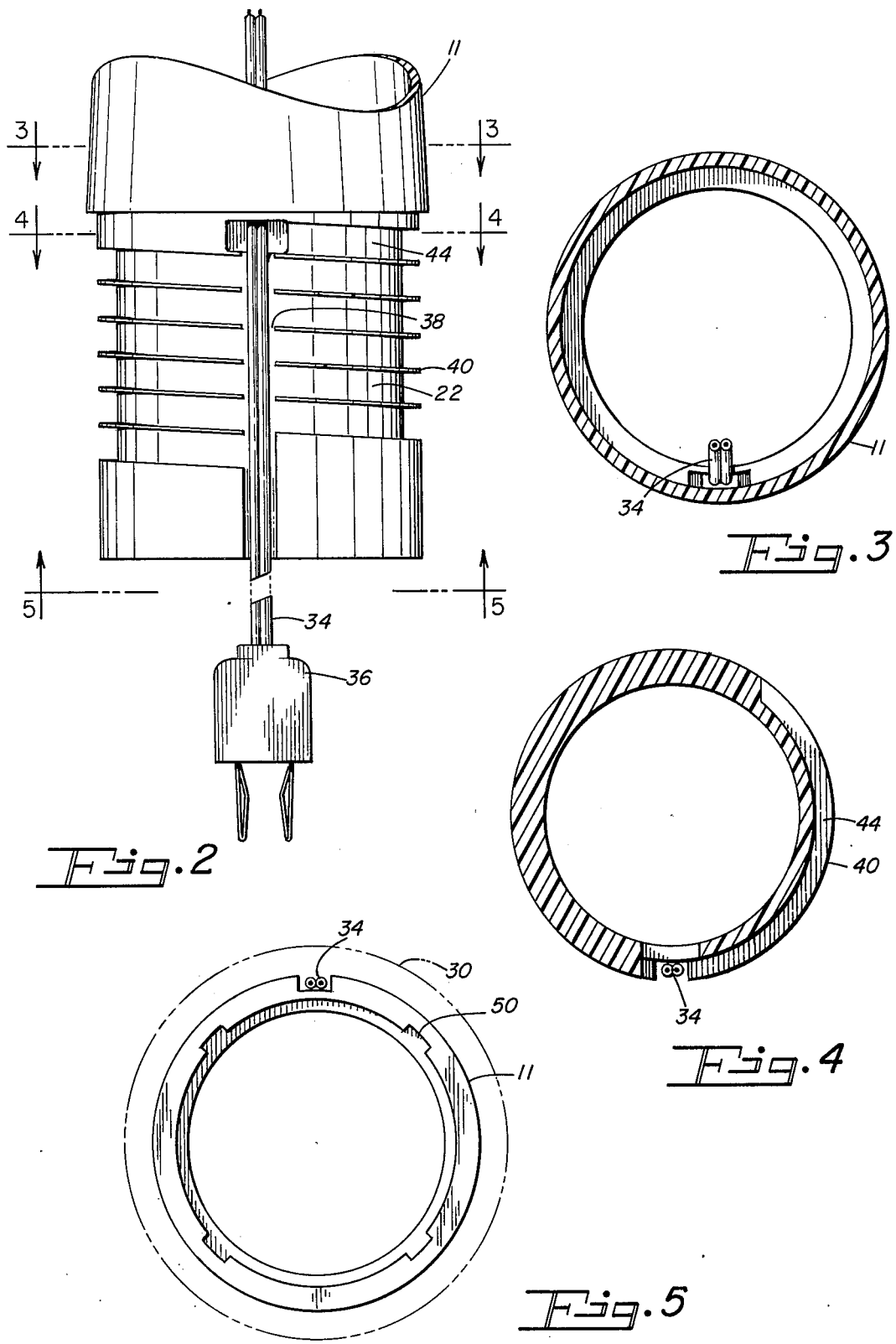

REEL FOR STORING AN ELECTRICAL LINE CORD

BACKGROUND OF THE INVENTION

The present invention relates to a reel for storing an electrical line cord. More particularly, the present invention relates to reels especially adopted for winding unneeded line cord for electrical appliances.

Devices for heating dispensed product, other heating devices, reading lamps, fans and other electrical appliances usually have a predetermined length of cord connected thereto. The free end of which is equipped with an attaching plug adapted for connection in an electrical outlet whereby the appliance may be connected in an electrical circuit. Frequently it is not necessary to use the entire length of cord provided and the excess length presents an unsightly appearance and is otherwise objectionable.

SUMMARY OF THE INVENTION

It is an object of the present invention to eliminate any excess length of cord or the like between an electrical appliance and an outlet by winding any excess cord or the like on a reel and thereby obviate the unsightly appearance and other objections accruing from the presence of an excessive length of cord or the like.

In accordance with the present invention, there is provided a reel for storing an electrical line cord comprising a cylindrical member, and a channel helically formed on the cylindrical member. A sleeve is concentrically aligned with the cylindrical member and encloses the channel. A slotted perforation is formed in the sleeve and extends across the channel. Mounting means are provided for permitting relative rotational movement between the cylindrical member and the sleeve. The electrical line cord extends between the cylindrical member and the sleeve into one end of the channel and from the channel through the slotted perforation. Relative rotation in one direction between the cylindrical member and the sleeve winds the electrical line cord in the channel, and relative rotation in another direction between the cylindrical member and the sleeve unwinds the electrical line cord from the channel out through the slotted perforation.

BRIEF DESCRIPTION OF THE DRAWINGS

FIG. 2 is a side elevational view of a shell portion of the dispenser of FIG. 1 with the top portion of the shell broken away;

FIG. 3 is a cross-sectional view taken along line 3—3 of FIG. 2;

FIG. 4 is a cross-sectional view taken along line 4—4 of FIG. 2; and

FIG. 5 is a bottom plan view taken along line 5—5 of FIG. 2.

DESCRIPTION OF SPECIFIC EMBODIMENTS

Figure 1:
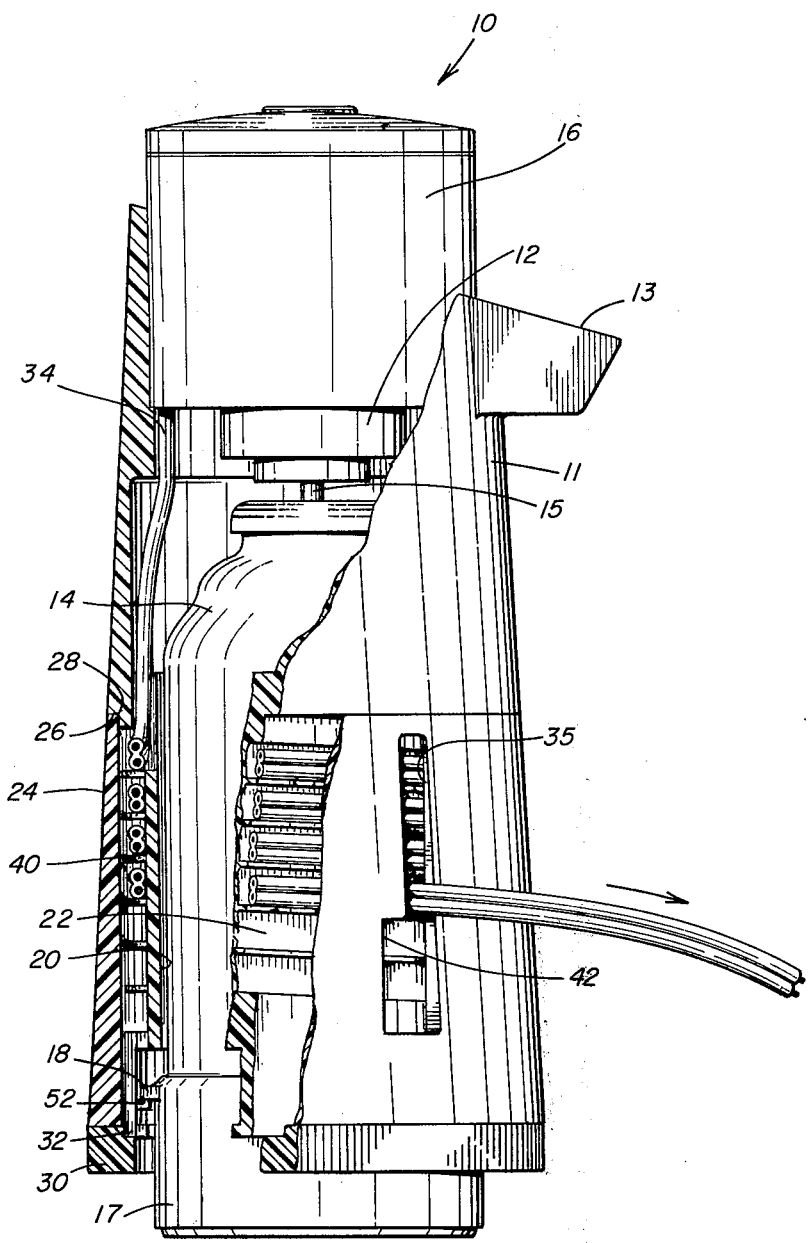
FIG. 1 is a side elevational view of a hot cream dispenser embodiment of the present invention with a portion of the dispenser broken away.

With reference to the Figures, an aerosol can 14 having a product such as a shaving cream is inserted through the lower end of a dispenser 10. A valve stem 15 of the aerosol can 14 is positioned in the lower end of a heat exchanger 12. The heat exchanger 12 has an outlet conduit (not shown) in fluid communication with a spout 13, and in abutting contact with a heater 16. U.S. Pat. No. 3,358,885 provides a detailed description of a suitable hot cream dispenser having a heat exchanger and heat generating means for use in combination with an aerosol can. U.S. Pat. No. 3,358,885 is incorporated herein by reference.

The dispenser 10 has a generally cylindrical shell 11 permanently secured to the heater 16. The shell has a cavity 20 for receiving the can 14. A channel 22 is helically formed on the outer surface of the shell 11, and a sleeve 24 is fitted over the shell 11 to enclose the channel 22. The upper end 26 of the sleeve 24 is seated in a right-angled cut-out annular portion 28 of the shell 11. A retaining ring 30 is bonded to the shell 11 along a seat 32 to retain the sleeve 24 in the position shown in FIG. 1, but to permit relative rotational movement between the sleeve 24 and the shell 11. An electrical line cord 34 extends downwardly from the heater 12 to the channel 22 and outwardly through a slotted perforation 35.

As shown in FIG. 2, the electrical line cord 34 has an electrical outlet plug 36 at the free end thereof and the cord 34 is initially positioned during assembly against the shell 11 in a vertical passage 38 formed by openings in the wall 40 of the helical channel 22. The plug 36 is then passed outwardly through a wide portion 42 (FIG. 1) of the slotted perforation 35, as the sleeve 24 is being fitted over the lower end of the shell 11. Then the retaining ring 30 is bonded to the shell 11. Thereafter, the cord is lifted out of the passage 38, and initially held upwardly to thread the cord 34 into the beginning 44 of the channel 22 at the upper end thereof. The sleeve 24 is held steady and the shell 11 is rotated in a counter-clockwise direction as viewed in FIG. 5 to wind the cord 34 into the channel 22. Thus, the channel 22 and the sleeve 24 function as a line cord reel.

As shown in FIG. 1, the channel wall 40 is as close to the inner surface of the sleeve 24 as manufacturing tolerances permit to prevent the cord 34 from becoming wedged between the channel wall 40 and the sleeve 24. Accordingly, the slotted perforation 35 extends across the channel 22 to permit the cord 34 to be wound on and unwound from the reel (22, 24).

A user unwinds a needed portion of the cord 34 by grasping the sleeve 24 in one hand and pulling the cord 34 with the other hand in the direction of the arrow shown in FIG. 1. Such action will cause the shell 11 to rotate in a clockwise direction as viewed in FIG. 5 as the cord 34 unwinds.

Conversely, the user winds the cord onto the reel (22, 24) by grasping the sleeve 24 with one hand, and rotating the shell 11 in a counter-clockwise direction as viewed in FIG. 5.

It is apparent that the channel can be formed on the inner surface of the sleeve, or that the sleeve can be fitted in the shell with the channel formed on either the inner surface of the shell or on the outer surface of the sleeve. In any case, relative rotational movement in one direction between the shell and the sleeve will unwind the cord, and relative rotational movement in the other direction will wind the cord on the reel.

The can 14 has an annular base 17 adapted to be disposed around the lower end of the can 14. The base 17 has a plurality of spaced outwardly projecting lugs 18 which are initially aligned with openings 50 (FIG. 5) at the lower end of the shell 11 to fit the can 14 into the shell 11. The can 14 is then rotated clockwise as viewed in FIG. 5 to seat the lugs 18 on ridges 52. Product is dispensed from the can 14 through the nozzle 15 to the heat exchanger 12 when a downward force is applied to the top of the dispenser.

It is obvious that the broad aspect of the present invention has wide application to appliances having electrical line cords, and is not limited to dispensers for heating dispensed product.

What is claimed is:

1. A dispenser for heating a product from a replaceable container comprising:
   a. means for heating the product,
   b. a hollow shell connected to and extending downwardly from said heating means, said shell having an opened bottom end for receiving the container therein,
   c. a channel helically formed on an outer surface of said shell,
   d. a sleeve concentrically aligned with said shell and enclosing said channel,
   e. a slotted perforation formed in said sleeve and extending across said channel,
   f. means for rotatably interconnecting said sleeve and shell, and
   g. an electrical line cord extending from said heating means between said sleeve and said shell into one end of said channel and from said channel outwardly through said perforation,
   h. said sleeve being held by one hand of a user and said electrical cord being pulled outwardly by the other hand of the user to unwind said electrical cord from said channel as said shell rotates in one direction, and
   i. said sleeve being held by one hand of the user and said shell being rotated by the other hand of the user in a direction opposite said one direction to wind said electrical cord in said channel.

2. The dispenser of claim 1 wherein the product is a shaving cream and the container is an aerosol can.

* * * * *